(12) United States Patent
Ji et al.

(10) Patent No.: US 12,455,639 B2
(45) Date of Patent: Oct. 28, 2025

(54) STYLUS WITH ATTACHMENT DETECTION (71) Applicant: Apple Inc., Cupertino, CA (US)

(72) Inventors: Qigen Ji, San Mateo, CA (US); Jeremy Goldberg, Santa Clara, CA (US); Nicolas Huynh, San Jose, CA (US); Patrick Liu, Sunnyvale, CA (US); Stephanie Chou, San Francisco, CA (US); Stephen J. Marrone, San Francisco, CA (US); Youqun Dong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/614,558

(22) Filed: Mar. 22, 2024

(65) Prior Publication Data

US 2025/0110583 A1  Apr. 3, 2025

Related U.S. Application Data (60) Provisional application No. 63/541,272, filed on Sep. 28, 2023.

(51) Int. Cl.
G06F 3/0354 (2013.01)
G06F 3/0346 (2013.01)
G06F 3/038 (2013.01)

(52) U.S. Cl.
CPC ........ G06F 3/03545 (2013.01); G06F 3/0346 (2013.01); G06F 3/0383 (2013.01)

(58) Field of Classification Search
CPC ... G06F 3/03545; G06F 3/0346; G06F 3/0383
See application file for complete search history.

(56) References Cited

U.S. PATENT DOCUMENTS

| | | | | |
|---|---|---|---|---|
| 4,695,680 A | * | 9/1987 | Kable | G06F 3/03545 178/19.03 |
| 5,004,871 A | * | 4/1991 | Purcell | G06F 3/03545 178/19.04 |
| 2017/0068339 A1 | | 3/2017 | Zimmerman et al. | |
| 2017/0068342 A1 | * | 3/2017 | Zimmerman | G06F 3/0414 |
| 2020/0089340 A1 | | 3/2020 | Ruscher et al. | |
| 2020/0328614 A1 | * | 10/2020 | Jackson | G04C 10/04 |
| 2021/0004113 A1 | * | 1/2021 | Autio | G06F 3/0446 |

* cited by examiner

Primary Examiner — David D Davis
(74) Attorney, Agent, or Firm — BAKERHOSTETLER (57) ABSTRACT An input device, such as a stylus, can be operated to determine one or more conditions and select an appropriate operating mode. For example, a stylus can be attached to a host device when not in active use by a user. Attachment can be securely and releasably achieved with magnetic coupling. In such a configuration, the stylus can detect the attachment based on the presence and modification of magnetic fields. Based on such detection, the stylus can select an operating mode that allows power to be conserved when it is determined that certain components of the stylus need not be actively operated.

19 Claims, 6 Drawing Sheets

STYLUS WITH ATTACHMENT DETECTION

CROSS-REFERENCE TO RELATED APPLICATION

This application claims the benefit of U.S. Provisional Application No. 63/541,272, entitled "STYLUS WITH ATTACHMENT DETECTION," filed Sep. 28, 2023, the entirety of which is incorporated herein by reference.

TECHNICAL FIELD

The present description relates generally to input devices, such as styluses, and, more particularly, to touch-based input devices that can detect conditions and adapt operations accordingly.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some electronic devices that include a display surface and/or a touch panel receive tactile input from a user. A touch-based input device, such as a stylus, can be operated by a user to provide inputs to such an electronic device. Such interactions can be based on various types of user inputs that are provided by manipulation of the stylus. Accordingly, the stylus can provide various components to detect and receive the user inputs while the stylus is in active use by the user.

It can be desirable to conserve power of an electronic device, particularly when then device is not in active use by the user. There may be multiple conditions that indicate that a stylus is not in use. For example, where a stylus is maintained at rest, it can be determined that the stylus is not in use and that one or more components need not be operated. Additionally, where a stylus is attached to a host device, it can be also be determined that the stylus is not in use and that one or more components need not be operated. However, such different conditions can be detected in different ways and/or with different components of the stylus. As such, it can be beneficial to optimize detection operations so that power is conserved in an efficient manner without limiting operations of the stylus while in use.

An input device, such as a stylus, can be operated to determine one or more conditions and select an appropriate operating mode. For example, a stylus can be attached to a host device when not in active use by a user. Attachment can be securely and releasably achieved with magnetic coupling. In such a configuration, the stylus can detect the attachment based on the presence and modification of magnetic fields. Based on such detection, the stylus can select an operating mode that allows power to be conserved when it is determined that certain components of the stylus need not be actively operated.

These and other embodiments are discussed below with reference to FIGS. 1-10. However, those skilled in the art will readily appreciate that the detailed description given herein with respect to these figures is for explanatory purposes only and should not be construed as limiting.

A touch-based input device in accordance with embodiments disclosed herein can include any device that is held, worn, or contacted by a user for providing input and/or receiving feedback. An example of a touch-based input device is a stylus, such as a stylus having one or more electronic components for performing functions during operation by a user.

Figure 1:
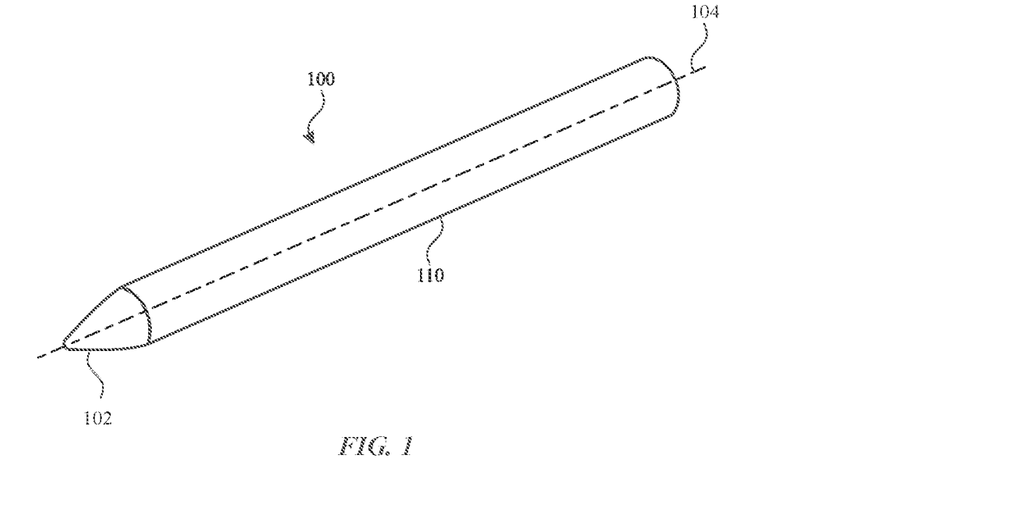
FIG. 1 illustrates a perspective view of a stylus, according to some embodiments of the subject technology.

As shown in FIG. 1, a stylus 100 can support handling and operation by a user. In particular, stylus 100 can receive inputs from a user and detect such inputs at tip 102. According to some embodiments, for example as illustrated in FIG. 1, stylus 100 can include a housing 110 that provides an outermost cover along at least a portion of the length of stylus 100. A user can grip stylus 100 at a user grip region along a portion of housing 110 during use of stylus 100. Housing 110 can define an outermost surface along a portion of stylus 100.

Initially, reference is made to certain physical and operational characteristics of stylus 100. Stylus 100 may take various forms to facilitate use and manipulation by the user. As shown in FIG. 1, stylus 100 has the general form of a writing instrument such as a pen or a pencil. In the illustrated embodiment, housing 110 can define two end portions that define longitudinal ends of stylus 100. Housing 110 can define at least half of a total length of stylus 100. In this example, one end of housing 110 are terminated with tip 102. Either end of housing 110 (e.g., tip 102) can be removable, affixed to housing 110, or an integral part of housing 110.

Stylus 100 can include tip 102 for contacting a surface. Stylus 100 can include one or more sensors that detect when tip 102 contacts and applies a force or pressure to the surface. Such sensors can include one or more contact sensors, capacitive sensors, touch sensors, cameras, piezoelectric sensors, pressure sensors, proximity sensors, electric field sensors, photodiodes, and/or other sensors operable to detect contact with the surface. Tip 102 can have one or more of a variety of shapes, dimensions, and/or other features to provide desired aspects of an interaction between stylus 100 and a surface, as described further herein.

As illustrated in FIG. 1, tip 102 can form particular shape at a terminal end of stylus 100. Although illustrated in FIG. 1 as a cone, tip 102 need not take a conical or frustoconical shape in all embodiments. Tip 102, or portions thereof, can exhibit a constant or adjustable size and/or shape, as discussed further herein.

As shown in FIG. 1, housing 110 and tip 102 of stylus 100 can extend along a longitudinal axis 104 of stylus 100. Longitudinal axis 104 of stylus 100 can be a central axis and/or a longitudinal axis that extends along a length defining a maximum dimension of stylus 100. For example, longitudinal axis 104 can extend through opposing ends defined by housing 110 and tip 102, and housing 110 can include walls that extend parallel to and circumferentially surround a portion of longitudinal axis 104.

Figure 2:
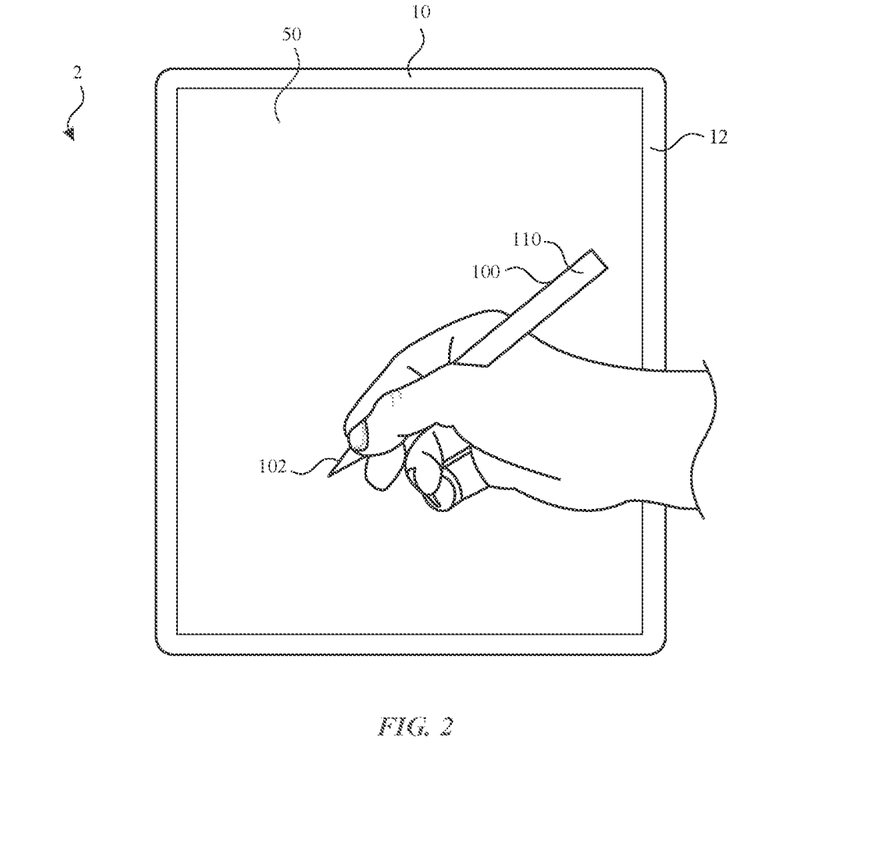
FIG. 2 illustrates a view of a system including the stylus of FIG. 1 and a host device, according to some embodiments of the subject technology.

The touch-based input device can be used alone or in conjunction with another device. For example, FIG. 2 illustrates a system 2 including stylus 100 and a host device 10 having a housing 12 and a display 50, according to some embodiments of the subject technology. Stylus 100 can be held by a user and operated as a touch-based input device for use with host device 10.

Stylus 100 can be operated to contact display 50 of host device 10 with tip 102. Such contact can be detected by host device 10 and/or stylus 100. For example, stylus 100 can include one or more sensors that detect when tip 102 contacts and applied pressure to display 50. In some embodiments, the sensors can optionally operate cooperatively with host device 10 to detect contact with display 50.

Display 50 can include or be coupled to a touch panel for interacting with stylus 100 when contacted thereby. Host device 10 can operate display 50 to render images to convey information to the user. Display 50 can be configured to show text, colors, line drawings, photographs, animations, video, and the like. Display 50 of host device 10 can be implemented with any suitable technology, including, but not limited to, a multi-touch and/or multi-force sensing touchscreen that uses liquid crystal display technology, light-emitting diode technology, organic light-emitting display technology, organic electroluminescence technology, electronic ink, or another type of display technology or combination of display technology types. One or more implementations can include devices that function as both input and output devices, such as a touchscreen. For example, display 50 can be configured for receiving user inputs, such as tap inputs and swipe inputs. Display 50 can be, include or be connected to a touch-sensitive surface that detects touch inputs from a user (e.g., with a finger) and/or from stylus 100 (e.g., with tip 102). In some examples, display 50 and the touch-sensitive surface form a touch-sensitive display to operate as a user interface for interaction by a user.

Figure 3:
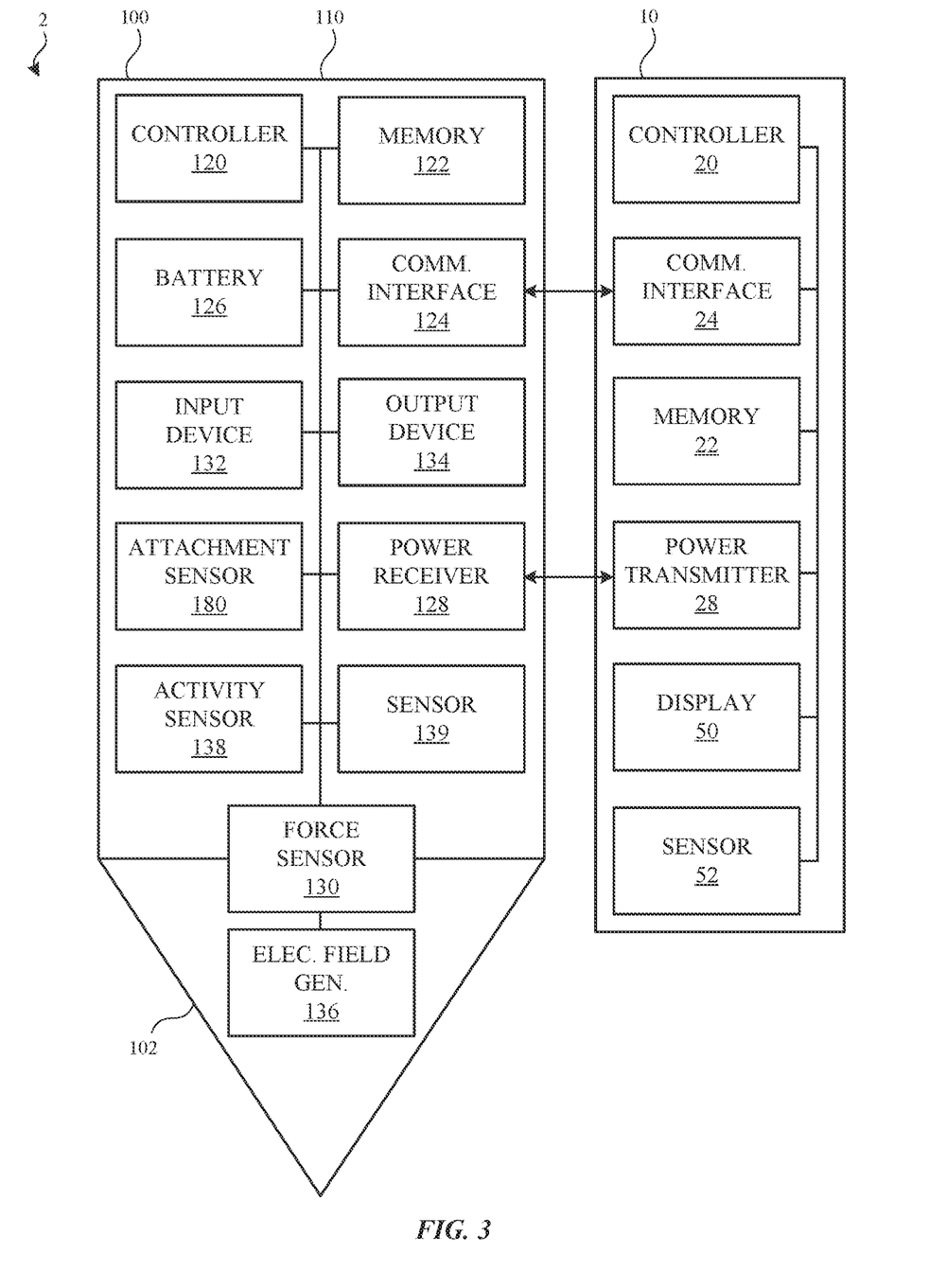
FIG. 3 illustrates a block diagram of the stylus and the host device of FIG. 2, according to some embodiments of the subject technology.

Referring now to FIG. 3, a stylus and a host device can include components that support operation by a user.

As shown in FIG. 3, stylus 100 can include a controller 120 (e.g., including a processor) and a memory 122 (e.g., non-transitory storage medium). Memory 122 can include, for example, a magnetic storage medium, optical storage medium, magneto-optical storage medium, read-only memory, random access memory, erasable programmable memory, flash memory, or combinations thereof. According to some embodiments, controller 120 can execute one or more instructions stored in memory 122 to perform one or more functions. For example, memory 122 can store one or more tip or other profiles that an actuator of stylus 100 may utilize to modify or otherwise control a characteristic of tip 102. In some cases, stylus 100 may retrieve a specific tip or other profile utilizing one or more inputs from a user and/or signals from host device 10.

Stylus 100 can include a communication interface 124 for communicating with host device 10 and/or another device. Communication interface 124 can include one or more wired or wireless components, WiFi components, near field communication interfaces, Bluetooth components, and/or other communication interfaces. Communication interface 124 can include one or more transmission elements, such as one or more antennas. Alternatively or in combination, communication interface 124 can include an interface for a wired connection to host device 10 and/or another device.

Stylus 100 can include a battery 126, such as one or more batteries and/or power management units. Stylus 100 can include components for charging battery 126. Battery 126 can include a lithium-polymer battery pack or a lithium-ion battery. However, in other embodiments, alkaline batteries, nickel-cadmium batteries, nickel-metal hydride batteries, or any other suitable rechargeable or one-time-use batteries may be used.

Stylus 100 can include a power receiver 128. For example, power receiver 128 can receive power, for example from host device 10, for charging battery 126. In some embodiments, power receiver 128 can receive power wirelessly (e.g., inductively). In some embodiments, power receiver 128 can receive power via a physical connection (e.g., Lighting connector, USB connector, etc.). It will be understood that power can be received and transmitted in either or both directions between stylus 100 and host device 10. It will be understood that such a charging link can also serve as a communication link between stylus 100 and host device 10.

Stylus 100 can include one or more input devices 132 to receive input from a user. In some embodiments, input device 132 can detect contact by a user on a grip region of housing 110 of stylus 100. In some embodiments, input device 132 can include a capacitive touch sensor, such as a self-capacitance sensor. In some embodiments, input device 132 can include multiple sensing elements, such as conductive electrodes, to detect contact and changes in contact at multiple locations. Gestures detected by the separate touch sensors can be interpreted as different user inputs according to preprogrammed functions to be performed by stylus 100 and/or host device 10 upon detection of the user gestures. In some embodiments, input device 132 can include other components including, but not limited to, sensors, capacitive touch sensors, switches (e.g., dome switches), buttons, keys, crowns, voice coils, microphones, and/or the like.

Stylus 100 can include one or more output devices 134 to provide output to a user. In some embodiments, output device 134 can include a display, speaker, haptic feedback component, light, and/or the like. In some embodiments, output device 134 can provide haptic feedback with tactile sensations to the user. The haptic feedback can be implemented as force feedback, vibratory feedback, tactile sensations, and the like. For example, output device 134 can include a linear actuator configured to provide punctuated haptic feedback, such as a tap or a knock.

Stylus 100 can include one or more attachment sensors 180. Attachment sensor 180 can include a Hall effect sensor, a magnetometer, a magnetic encoder, a reed switch, a compass, and/or another sensor configured to detect magnetic fields and/or changes thereof. For example, attachment sensor 180 can detect the magnitude, orientation, or other characteristic of a magnetic field emitted by and/or influenced by a magnet of host device 10, as described further herein. by further example, attachment sensor 180 can distinguish between magnetic fields in the absence of host device 10 (e.g., including magnetic fields emitted by and/or influenced by a magnet of stylus 100) and magnetic fields in the presence of host device 10 (e.g., including magnetic fields emitted by and/or influenced by a magnet of host device 10).

Detections performed by attachment sensor 180 can form a basis for determining one or more other operations of stylus 100. For example, one of multiple power modes can be selected by stylus 100 based on one or more detections by attachment sensor 180. In some embodiments, a detection by attachment sensor 180 can indicate whether stylus 100 is attached to host device 10. In such a detectable condition, it can be inferred that stylus 100 is not being operated as an input device by a user. Accordingly, attachment sensor 180 can indicate when stylus 100 can disable one or more components thereof, as described further herein. In one or more modes of stylus 100, attachment sensor 180 can remain actively operated to perform detections that form a basis for transitioning to a different power mode of stylus 100.

Stylus 100 can include one or more activity sensors 138 for detecting one or more conditions. In some embodiments, activity sensor 138 can detect motion characteristics of stylus 100 with a motion sensor such as an accelerometer, a speedometer, a gyroscope, a compass, a global positioning sensor (e.g., satellite-based positioning components), a tilt sensor, and so on for detecting movement and acceleration of stylus 100. In some embodiments, one or more activity sensors 138 can be configured to detect a motion, position, orientation, speed, and/or acceleration of stylus 100. For example, activity sensor 138 can include an inertial measurement unit ("IMU") that provides information regarding a characteristic of stylus 100, such as inertial angles thereof. By further example, the IMU can include a six-degrees of freedom IMU that calculates the vehicle's position, velocity, and/or acceleration based on six degrees of freedom (x, y, z, θx, θy, and θz). The IMU can include one or more of an accelerometer, a gyroscope, and/or a magnetometer.

Detections performed by activity sensor 138 can form a basis for determining one or more other operations of stylus 100. For example, one of multiple power modes can be selected by stylus 100 based on one or more detections by activity sensor 138. In some embodiments, a detection by activity sensor 138 can indicate whether stylus 100 is being moved. In such a detectable condition, it can be inferred that stylus 100 is not being operated as an input device by a user. Accordingly, activity sensor 138 can indicate when stylus 100 can disable one or more components thereof, as described further herein. In one or more modes of stylus 100, activity sensor 138 can remain actively operated to perform detections that form a basis for transitioning to a different power mode of stylus 100.

Stylus 100 can include one or more additional sensors 139. In some embodiments, additional sensor 139 can detect environmental conditions and/or other aspects of the operating environment of stylus 100 with an environmental sensor such as an ambient light sensor, proximity sensor, temperature sensor, barometric pressure sensor, moisture sensor, and the like. In some embodiments, additional sensor 139 can detect biological characteristics of the user manipulating the stylus with a biosensor that detects skin temperature, heart rate, respiration rate, blood oxygenation level, blood volume estimates, blood pressure, or a combination thereof. In some embodiments, additional sensor 139 can quantify or estimate a property of an object (e.g., host device 10) nearby or otherwise external to stylus 100 with a utility sensor such as magnetic field sensors, electric field sensors, color meters, acoustic impedance sensors, pH level sensor, material detection sensor, and so on. Such data may be used to adjust or update the operation of stylus 100 and/or may communicate such data to host device 10 to adjust or update the operation thereof.

Stylus 100 can include one or more force sensors 130 configured to interact with both tip 102 and housing 110 to detect relative motion of tip 102 and housing 110. For example, force sensor 130 can be operated to detect when tip 102 is contacting a surface, such as the surface of host device 10. The detection can be based on movement of tip 102 relative to housing 110. Accordingly, force sensor 130 can be directly or indirectly connected to both tip 102 and housing 110 to detect relative motion there between. Force sensor 130 can include a component that converts mechanical motion of tip 102 into an electric signal. Force sensor 130 can include one or more contact sensors, capacitive sensors, touch sensors, strain gauges, cameras, piezoelectric sensors, pressure sensors, photodiodes, and/or other sensors. Force sensor 130 can detect both the presence and magnitude of a force. In use, a user may manipulate stylus 100 and apply a force to a surface of host device 10. A corresponding reaction force may be transferred through tip 102 of stylus 100 connected to an electromechanical coupling and to force sensor 130 of stylus 100. Force sensor 130, or a portion thereof, may deform in response which may be measured and used to estimate the applied force. Force sensor 130 can be used to produce a non-binary output that corresponds to the applied force. For example, force sensor 130 can be used to produce an output that represents a magnitude that varies in accordance with a variable amount of applied force.

Stylus 100 can include one or more electric field generators 136 configured to emit an electric field for detection by host device 10. Electric field generators 136 can create substantially spherical electric fields at tip 102. Each of electric field generators 136 can include one or more conductive components. Electric field generators 136 can be spaced apart from each other so that the center of each corresponding electric field is at a different location. Accordingly, host device 10 can detect each corresponding electric field and determine a position and/or orientation of stylus 100.

While various components of stylus 100 are shown as being positioned at either housing and/or tip 102, it will be understood that any one or more components of stylus 100 can be positioned at any location thereof.

As further shown in FIG. 3, host device 10 can include a controller 20 (e.g., including a processor) and a memory 22 (e.g., non-transitory storage medium). Memory 22 can include, for example, a magnetic storage medium, optical storage medium, magneto-optical storage medium, read-only memory, random access memory, erasable programmable memory, flash memory, or combinations thereof. According to some embodiments, controller 20 can execute one or more instructions stored in memory 22 to perform one or more functions. For example, memory 22 can store one or more tip or other profiles that an actuator of stylus 100 may utilize to modify or otherwise control a characteristic of tip 102.

Host device 10 can include a communication interface 24 for communicating with stylus 100 and/or another device. Communication interface 24 can include one or more wired or wireless components, WiFi components, near field communication interfaces, Bluetooth components, and/or other communication interfaces. Communication interface 24 can include one or more transmission elements, such as one or more antennas. Alternatively or in combination, communication interface 24 can include an interface for a wired connection to stylus 100 and/or another device.

Host device 10 can include a power transmitter 28. For example, power transmitter 28 can transmit power, for example to stylus 100, for charging battery 126 of stylus 100. In some embodiments, power transmitter 28 can transmit power wirelessly (e.g., inductively). In some embodiments, power transmitter 28 can transmit power via a physical connection (e.g., Lighting connector, USB connector, etc.). It will be understood that power can be received and transmitted in either or both directions between stylus 100 and host device 10. It will be understood that such a charging link can also serve as a communication link between stylus 100 and host device 10.

Host device 10 can include display 50 for outputting visual information. Display 50 can include, for example, display devices, such as a liquid crystal display (LCD), a light emitting diode (LED) display, an organic light emitting diode (OLED) display, a flexible display, a flat panel display, a solid-state display, a projector, or any other device for outputting visual information. One or more implementations can include devices that function as both input and output devices, such as a touchscreen.

Host device 10 can include one or more sensors 52. In some embodiments, sensors 52 can detect touch input, for example, with a capacitive touch sensor, a resistive touch sensor, and the like. In some embodiments, sensors 52 can detect electric fields output by electric field generators 136 of stylus 100. Host device 10 can locate stylus 100 on a surface by monitoring each sensing node for changes and estimating the location at which such changes (if any) have occurred. Accordingly, host device 10 can detect each corresponding electric field and determine a position and/or orientation of stylus 100.

Host device 10 can also include one or more other components that facilitate operation of host device 10. For example, host device 10 can include one or more of a power supply, one or more data connectors, one or more power connectors, one or more input/output devices, such as a speaker, a rotary input device, a microphone, an on/off button, a mute button, a biometric sensor, a camera, a force and/or touch sensitive trackpad, and so on.

Figure 4:
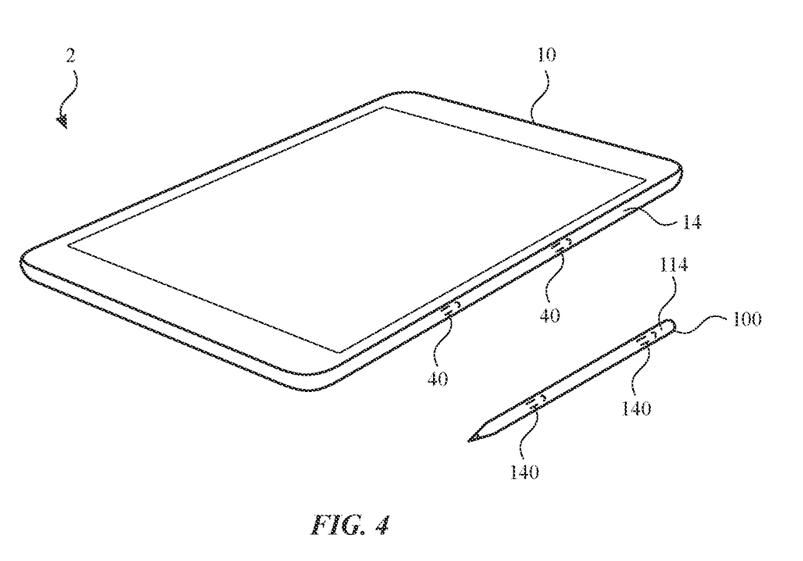
FIG. 4 illustrates a perspective view of a stylus and a host device in a separated configuration, according to some embodiments of the subject technology.
Figure 5:
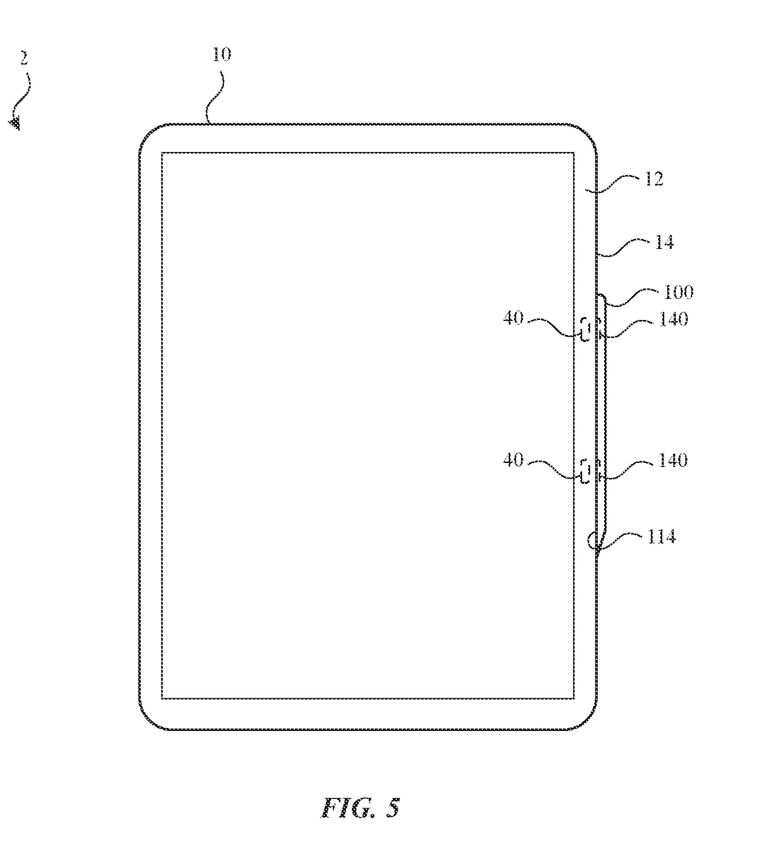
FIG. 5 illustrates a front view of the stylus and the host device of FIG. 4 in an attached configuration, according to some embodiments of the subject technology.

Referring now to FIGS. 4 and 5, use of a stylus with a host device can provide releasable attachment of the stylus to the host device. As shown in FIG. 4, multiple stylus magnet assemblies 140 can be positioned within housing 110 of stylus 100. In some embodiments, stylus magnet assemblies 140 can be positioned on a same radial side of stylus 100 and adjacent to an outer surface 114 of housing 110. It will be understood that additional stylus magnet assemblies 140 can optionally be included, and that stylus magnet assemblies 140 can be provided in other arrangements. Stylus magnet assemblies 140 can provide magnetic coupling to corresponding host magnet assemblies 40 of host device 10. It will be understood that additional stylus magnet assemblies 140 can optionally be included, and that the stylus magnet assemblies 140 can be provided in other arrangements.

As further shown in FIG. 4, multiple host magnet assemblies 40 can be positioned within housing 12 of host device 10. In some embodiments, host magnet assemblies 40 can be positioned on a same side of housing 12 and adjacent to an outer surface 14 of host device 10. It will be understood that additional host magnet assemblies 40 can optionally be included, and that host magnet assemblies 40 can be provided in other arrangements. Host magnet assemblies 40 can provide magnetic coupling to corresponding stylus magnet assemblies 140 of stylus 100. It will be understood that additional host magnet assemblies 40 can optionally be included, and that host magnet assemblies 40 can be provided in other arrangements.

As shown in FIG. 5, stylus 100 can be attached to host device 10 by magnetic coupling. For example, host magnet assemblies 40 and stylus magnet assemblies 140 can magnetically attract each other to apply attractive forces between stylus 100 and host device 10.

Outer surface 114 of the stylus can facilitate secure coupling to an outer surface 14 of host device 10. For example, outer surface 14 of host device 10 can provide another flat surface or other complementary shape to facilitate physical contact of the opposing surfaces. It will be understood that other surface shapes and features are contemplated to facilitate contact and engagement of the stylus to the host device. For example, the surfaces can be flat, curved, concave, convex, undulating, stepped, tapered, or another shape to provide engagement.

In some embodiments, other components of stylus 100 and/or host device 10 can be provided for facilitating interactions there between. For example, power receiver 128 of stylus 100 and power transmitter 28 of host device 10 (not shown in FIGS. 4 and 5) can be provided to transfer power while stylus 100 is attached to host device 10 with stylus magnet assemblies 140 and host magnet assemblies 40. Power receiver 128 and power transmitter 28 can be positioned so that, when the stylus magnet assemblies 140 are aligned with host magnet assemblies 40, power transmitter 28 is aligned with power receiver 128. The magnetic coupling can maintain the alignment during a charging session. It will be understood that such an arrangement is optional, and power transfer can be provided by other mechanisms, in another arrangement, and/or without magnetic coupling.

Figure 6:
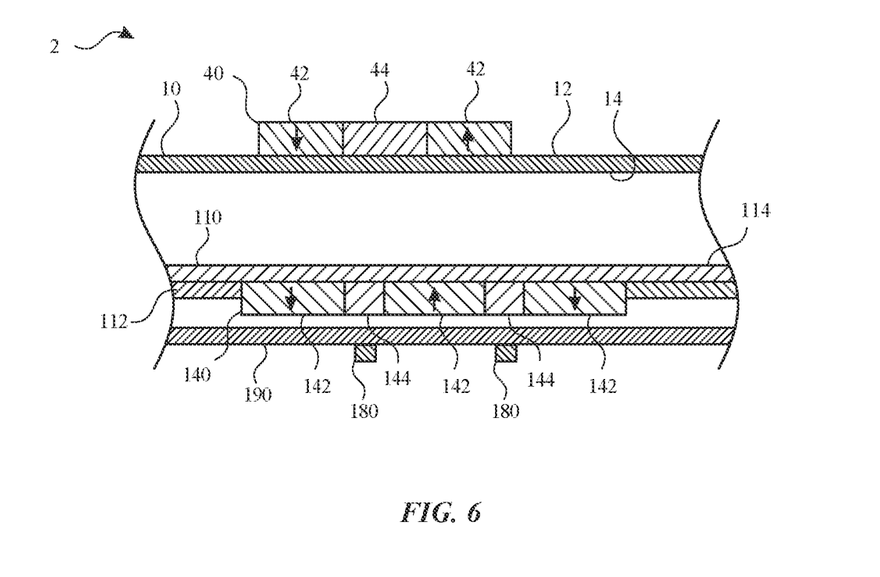
FIG. 6 illustrates a sectional side view of portions of a stylus and a host device in a separated configuration, according to some embodiments of the subject technology.
Figure 7:
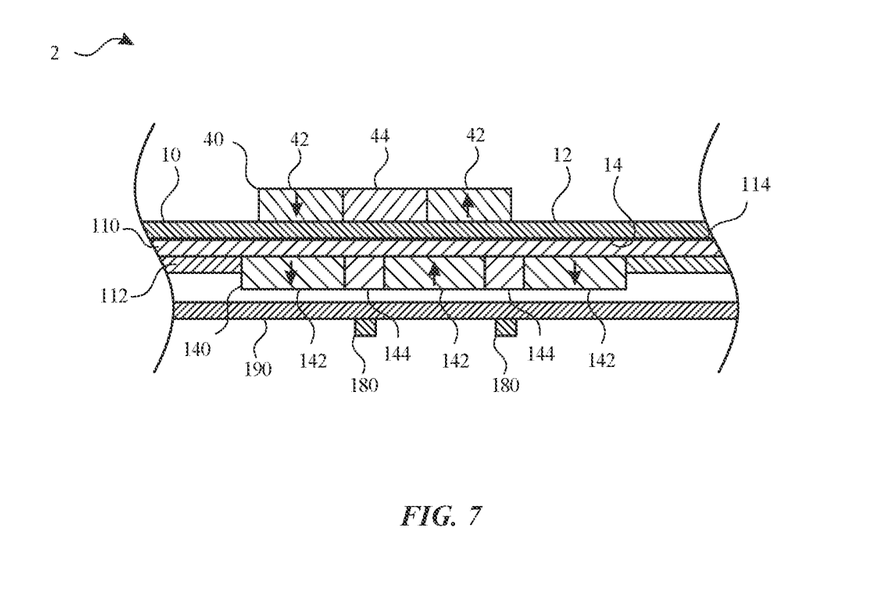
FIG. 7 illustrates a sectional side view of the portions of the stylus and the host device of FIG. 6 in an attached configuration, according to some embodiments of the subject technology.

Referring now to FIGS. 6 and 7, use of a stylus with a host device can provide releasable and detectable attachment of the stylus to the host device. While only one host magnet assembly 40 and one stylus magnet assembly 140 are shown in each of FIGS. 6 and 7, it will be understood that host device 10 can include multiple host magnet assemblies 40, and stylus 100 can include multiple stylus magnet assemblies 140. Each can optionally include one or more of the features illustrated in FIGS. 6 and 7.

As used herein, "magnet" can include a magnet of a hard magnetic material and/or a magnet of a soft magnetic material. Hard magnetic materials include materials that retain their magnetism even after the removal of an applied magnetic field. Magnets that include hard magnetic material can form permanent magnets. Hard magnetic materials include neodymium (NdFeB), ferrite, AlNiCo, iron-neodymium, iron-boron, cobalt-samarium, iron-chromium-cobalt, and combinations or alloys thereof. Soft magnetic materials include materials that are responsive to magnetic fields, but do not retain the same magnetism after removal of an applied magnetic field. Magnets that include soft magnetic material can form temporary magnets or magnetic shunts. Soft magnetic materials include iron, iron-cobalt, iron-silicon (FeSi), steel, stainless steel, iron-aluminum-silicon, nickel-iron, ferrites, and combinations or alloys thereof. It will be recognized that "hard magnetic" and "soft magnetic" does not necessarily relate to the rigidity of the materials.

As shown in FIG. 6, host magnet assemblies 40 can be provided within a housing 12 of host device 10. Each host magnet assembly 40 of host device 10 can include one or more permanent magnets 42 and/or one or more magnetic shunts 44. Permanent magnets 42 can form permanent magnetic fields for interacting with stylus 100. In some embodiments, permanent magnets 42 can form a multi-pole magnet structure that includes two or more individual magnets. For example, as shown in FIG. 6, different permanent magnets 42 can be arranged to vary the polarity pattern across host magnet assembly 40. For example, the polarity pattern can be an alternating polarity pattern where the north N (positive) and south S (negative) poles alternate across permanent magnets 42 due to the varying magnetic polarity orientations across permanent magnets 42. By further example, pairs of permanent magnets 42 (e.g., on opposing sides of a given magnetic shunt 44) can have opposing magnetic polarity orientations. Where additional (e.g., more than two) permanent magnets 42 are provided, some of the non-adjacent (e.g., first, third, fifth, etc.) permanent magnets 42 can have the same magnetic polarity orientation.

Permanent magnets 42 can be positioned on opposing sides of a given magnetic shunt 44, and magnetic shunt 44 can be positioned between a pair of permanent magnets 42. For example, magnetic shunts 44 can each include a soft magnetic material and be positioned adjacent to a permanent magnet 42. Magnetic shunts 44 can be positioned so that, when stylus 100 is attached to host device 10, magnetic shunts 44 face toward stylus magnet assembly 140 of stylus 100. Magnetic shunts 44 can optionally include soft magnetic material that is different than a hard magnet material of permanent magnets 42. For example, permanent magnets 42 can include a first magnetic material (e.g., neodymium) and magnetic shunts 44 can include a second magnetic material (e.g., iron-cobalt).

It will be understood that any number of permanent magnets 42 and/or magnetic shunts 44 can be provided. It will be further understood that permanent magnets 42 or magnetic shunts 44 can be omitted.

As further shown in FIG. 6, stylus magnet assemblies 140 can be provided within a housing 110 of stylus 100. For example, stylus magnet assemblies 140 can be supported by a frame 112 within housing 110. Each stylus magnet assembly 140 can be positioned within a corresponding opening of frame 112.

Each stylus magnet assembly 140 of stylus 100 can include one or more permanent magnets 142 and/or one or more magnetic shunts 144. Permanent magnets 142 can form permanent magnetic fields for interacting with host device 10. In some embodiments, permanent magnets 142 can form a multi-pole magnet structure that includes two or more individual magnets. For example, as shown in FIG. 6, different permanent magnets 142 can be arranged to vary the polarity pattern across the stylus magnet assembly 140. For example, the polarity pattern can be an alternating polarity pattern where the north N (positive) and south S (negative) poles alternate across permanent magnets 142 due to the varying magnetic polarity orientations across permanent magnets 142. By further example, pairs of permanent magnets 142 (e.g., on opposing sides of a given magnetic shunt 144) can have opposing magnetic polarity orientations.

Permanent magnets 142 can be positioned on opposing sides of a given magnetic shunt 144, and magnetic shunt 144 can be positioned between a pair of permanent magnets 142. For example, magnetic shunts 144 can each include a soft magnetic material and be positioned adjacent to a permanent magnet 142. Magnetic shunts 144 can be positioned so that, when stylus 100 is attached to host device 10, magnetic shunts 144 face toward stylus magnet assembly 140 of host device 10. Magnetic shunts 144 can optionally include soft magnetic material that is different than a hard magnet material of permanent magnets 142. For example, permanent magnets 142 can include a first magnetic material (e.g., neodymium) and magnetic shunts 144 can include a second magnetic material (e.g., iron-cobalt).

It will be understood that any number of permanent magnets 142 and/or magnetic shunts 144 can be provided. It will be further understood that permanent magnets 142 or magnetic shunts 144 can be omitted.

As further shown in FIG. 6, stylus 100 can include a board 190, such as a circuit board, printed circuit board, printed wiring board, and the like. Board 190 can support one or more components of stylus 100, including operable components, such as controllers, memory, and the like. Stylus 100 can include one or more attachment sensors 180 (e.g., Hall effect sensors), which can optionally be supported on board 190. In some embodiments, attachment sensor 180 can be positioned to a side of board 190 that faces away from stylus magnet assembly 140. Attachment sensor 180 can be positioned a distance away from corresponding magnetic shunt 144. For example, attachment sensor 180 can be axially aligned with magnetic shunt 144, such that attachment sensor 180 and magnetic shunt 144 share a same or similar axial position (e.g., with respect to and/or along a longitudinal axis of stylus 100). By further example, attachment sensor 180 can also be positioned axially between permanent magnets 142, such as permanent magnets 142 on opposing sides of corresponding magnetic shunt 144. As such, attachment sensor 180 can be radially across from and closer to magnetic shunt 44 than to either of permanent magnets 142. This can allow attachment sensor 180 to detect magnetic fields that are modified based on the presence of magnetic shunt 144, as described further herein.

As further shown in FIG. 7, multiple attachment sensors 180 (e.g., Hall effect sensors) can be provided. Each of the multiple attachment sensors 180 can be aligned with a single stylus magnet assembly 140. In particular, a given stylus magnet assembly 140 can have multiple magnetic shunts 144 and multiple permanent magnets 142. Permanent magnets 142 can have alternating magnetic polarity orientations across the stylus magnet assembly 140. Each magnetic shunt 144 can be aligned with corresponding attachment sensor 180.

As shown in FIG. 7, stylus 100 can be attached to host devices can in a manner that allows magnetic coupling between host magnet assemblies 40 and stylus magnet assemblies 140. For example, outer surface 114 of stylus 100 can be brought near or against outer surface 14 of host device 10. Accordingly, host magnet assemblies 40 are brought into proximity of stylus magnet assemblies 140. Magnetic coupling can attract the magnet assemblies to each other such that stylus 100 and host devices 10 are drawn together until outer surface 14 of stylus 100 is against and/or abuts outer surface 14 of host device 10.

Magnetic polarity orientations of host magnet assemblies 40 of host devices 10 and magnetic polarity orientations of stylus magnet assemblies 140 of stylus 100 can facilitate magnetic coupling. For example, for at least some of permanent magnets 42 having particular magnetic polarity orientations, permanent magnets 142 can have a same or similar magnetic polarity orientations. It will be understood that magnetic polarity orientations of any two magnets can be the same (e.g., parallel) or similar (e.g., within a limited angular range of being parallel) when, despite being at different positions, the magnets have magnetic fields that extend therein in directions that would be the same or similar if such magnets were superimposed onto each other. As such, permanent magnet 42 and permanent magnets 142 can have the same or similar magnetic polarity orientations when their magnetic fields extend distally from each in similar directions across the interface region between stylus 100 and host device 10.

It will be understood that host magnet assemblies 40 and stylus magnet assemblies 140 need not provide the same number, size, and/or position of magnets and/or magnetic shunts. As shown in FIGS. 6 and 7, permanent magnets 42 and permanent magnets 142 can be provided in different numbers, sizes, and positions. As further shown in FIGS. 6 and 7, magnetic shunts 44 and magnetic shunts 144 can be provided in different numbers, sizes, and positions.

It will be understood that host magnet assemblies 40 and stylus magnet assemblies 140 need not be precisely aligned to provide magnetic coupling and attachment. For example, a given stylus 100 with a particular arrangement of one or more stylus magnet assemblies 140 can magnetically couple with one or more host magnet assemblies 40 that are not directly across from stylus magnet assemblies 140 of stylus 100. As such, the magnetic coupling can be achieved despite variations in the arrangement of stylus magnet assemblies 140 and/or host magnet assemblies 40. Furthermore, a given stylus 100 with a particular arrangement of stylus magnet assemblies 140 can be securely attached to various host devices 10 with different arrangements of host magnet assemblies 40.

Magnetic shunts 44 and magnetic shunts 144 can facilitate magnetic coupling despite variations in magnet assemblies. For example, due to variations in arrangements, precise alignment (e.g., axial alignment) between permanent magnets 42 and permanent magnets 142 may not be possible. However, magnetic shunts 44 and magnetic shunts 144 can respond to permanent magnets aligned therewith to provide magnetic coupling across a range of axial positions despite a lack of precise alignment between permanent magnets 42 and permanent magnets 142.

As magnetic shunts 144 of stylus 100 are influenced by permanent magnets 42 of host device 10, attachment sensors 180 can be operated to detect such changes, as described further herein. Because the magnetic polarity orientations of different permanent magnets 42 of host device 10 can vary (e.g., alternate), different magnetic shunts 144 of stylus 100 can be influenced in different ways. In particular, two different permanent magnets 42 of host device 10 can have opposite magnetic polarity orientations. Accordingly, magnetic shunts 144 across from each of two different permanent magnets 42 can be influenced in opposing ways. Attachment sensors 180 aligned with each of magnetic shunts 144 can detect the different changes in magnetic field to help distinguish such changes from the influence of a single magnetic influence (e.g., strong magnet other than that of host device 10). In contrast, a single strong magnet in a vicinity of stylus 100 may influence each of magnetic shunts 144 in a similar way. Accordingly, by providing multiple attachment sensors 180, attachment to host device 10 can be distinguished from the presence of a strong magnet in the vicinity of stylus 100.

Figure 8:
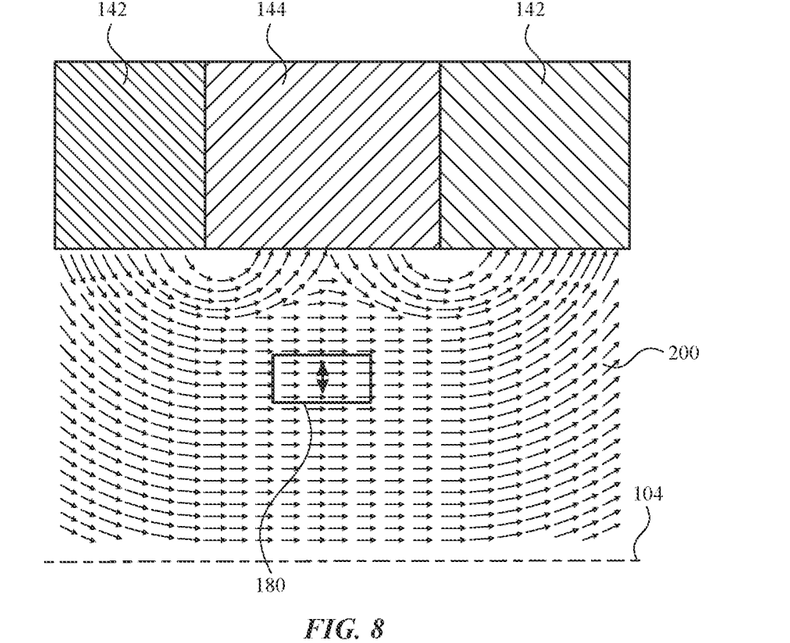
FIG. 8 illustrates a sectional side view of a portion of a stylus in a separated configuration with respect to a host device, according to some embodiments of the subject technology.
Figure 9:
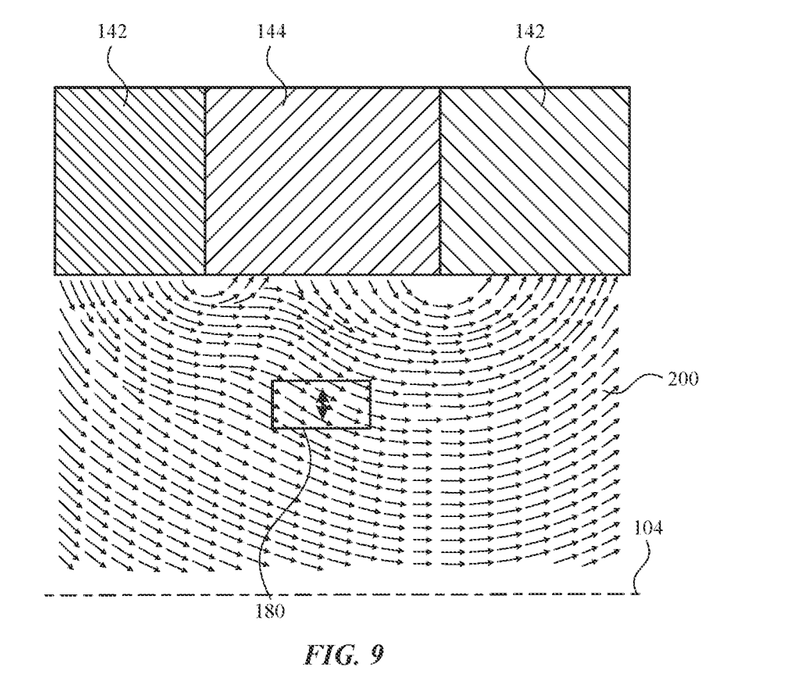
FIG. 9 illustrates a sectional side view of the portion of the stylus of FIG. 8 in an attached configuration with respect to the host device, according to some embodiments of the subject technology.

Referring now to FIGS. 8 and 9, attachment sensors can be operated to detect changes in a magnetic field and thereby detect attachment of a stylus to a host device. While only one attachment sensor 180 is illustrated in FIGS. 8 and 9, it will be understood that multiple attachment sensors 180 can be provided for a single stylus, with each attachment sensor 180 being provided at a different axial position and/or aligned with a different magnetic shunt 144.

As shown in FIG. 8, attachment sensor 180 (e.g., Hall effect sensor) can be positioned a distance away from corresponding magnetic shunt 144. For example, attachment sensor 180 can be axially aligned with magnetic shunt 144, such that attachment sensor 180 and magnetic shunt 144 share a same or similar axial position (e.g., with respect to and/or along longitudinal axis 104 of the stylus). By further example, attachment sensor 180 can also be positioned axially between permanent magnets 142, such as permanent magnets 142 on opposing sides of corresponding magnetic shunt 144. As such, attachment sensor 180 can be radially across from and closer to magnetic shunt 44 than to either of permanent magnets 142.

The example illustrated in FIG. 8 can correspond to a stylus that is not attached (e.g., magnetically coupled) to a host device (see FIGS. 4 and 6). In such a configuration, magnetic field 200 can be primarily influenced by permanent magnets 142. Magnetic shunt 144 can also be influenced by permanent magnets 142. Accordingly, magnetic field 200 can be substantially stable in the absence of an applied magnetic field from an external source. Attachment sensor 180 can be arranged in a fixed position and orientation and calibrated to determine the detectable characteristics of magnetic field 200 in the absence of an external magnetic field and/or while the stylus is not attached to the host device.

The example illustrated in FIG. 9 can correspond to a stylus that is attached (e.g., magnetically coupled) to a host device (see FIGS. 5 and 7). In such a configuration, magnetic field 200 can be influenced by both permanent magnets 142 of the stylus and the permanent magnets of the host device (not shown in FIG. 9). Magnetic shunt 144 can be influenced by permanent magnets 142 and the permanent magnets of the host device. In particular, while permanent magnets 142 undergo relatively little change in their magnetic field in the presence of the host device, magnetic shunt 144, comprising a soft magnetic material, can substantially alter its magnetic field in the presence of the host device and its magnet assembly. Accordingly, magnetic field 200 can be altered as magnetic shunt 144 is influenced by the presence of the host device, the host magnet assembly, and/or one or more permanent magnets of the host device.

As magnetic shunt 144 is influenced by the presence of the host device, magnetic field 200 is likewise modified. In particular, magnetic field 200 can be modified at the location of attachment sensor 180 when the stylus is attached to the host device. Such a modification can be detected as a change relative to the calibration conditions (e.g., in the absence of an applied magnetic field from an external source). As attachment sensor 180 can be arranged in the fixed position and orientation, such changes in magnetic field 200 can be determined to be based on an applied magnetic field from an external source, such as when the stylus is attached to the host device. The change in magnetic field 200 can include a change in direction and/or magnitude.

In some embodiments, attachment sensor 180 (e.g., Hall effect sensor) can be arranged to detect a magnetic field 200 having a component that is orthogonal to longitudinal axis 104 of the stylus. For example, as shown in FIG. 8, where magnetic field 200 is parallel to longitudinal axis 104 at the location of attachment sensor 180, magnetic field 200 can have no component thereof that is orthogonal to longitudinal axis 104. As such, attachment sensor 180 can detect no component of magnetic field 200 in such a direction. By further example, as shown in FIG. 9, where magnetic field 200 is transverse to longitudinal axis 104 at the location of attachment sensor 180, magnetic field 200 can have a non-zero component thereof that is orthogonal to longitudinal axis 104. As such, attachment sensor 180 can detect the non-zero component of magnetic field 200 in such a direction. It will be understood that attachment sensor 180 need not detect the full magnitude and direction of magnetic field 200 in either configuration. Rather, the change in magnetic field 200 can be sufficient to determine the influence of a magnet assembly of the host device and therefore the attachment state of the stylus with respect to the host device.

As described herein, such changes can be detected by each of multiple attachment sensors 180. At each of multiple attachment sensors 180, changes in magnetic field 200 can be different. Particular combinations of separately detected changes at different attachment sensors 180 can be determined to be the result of attachment to the host devices, rather than the result of another application of a magnetic field from an external source. Accordingly, attachment sensors 180 can be operated to determine when the stylus is attached to the host device and when the stylus is not attached to the host device.

Figure 10:
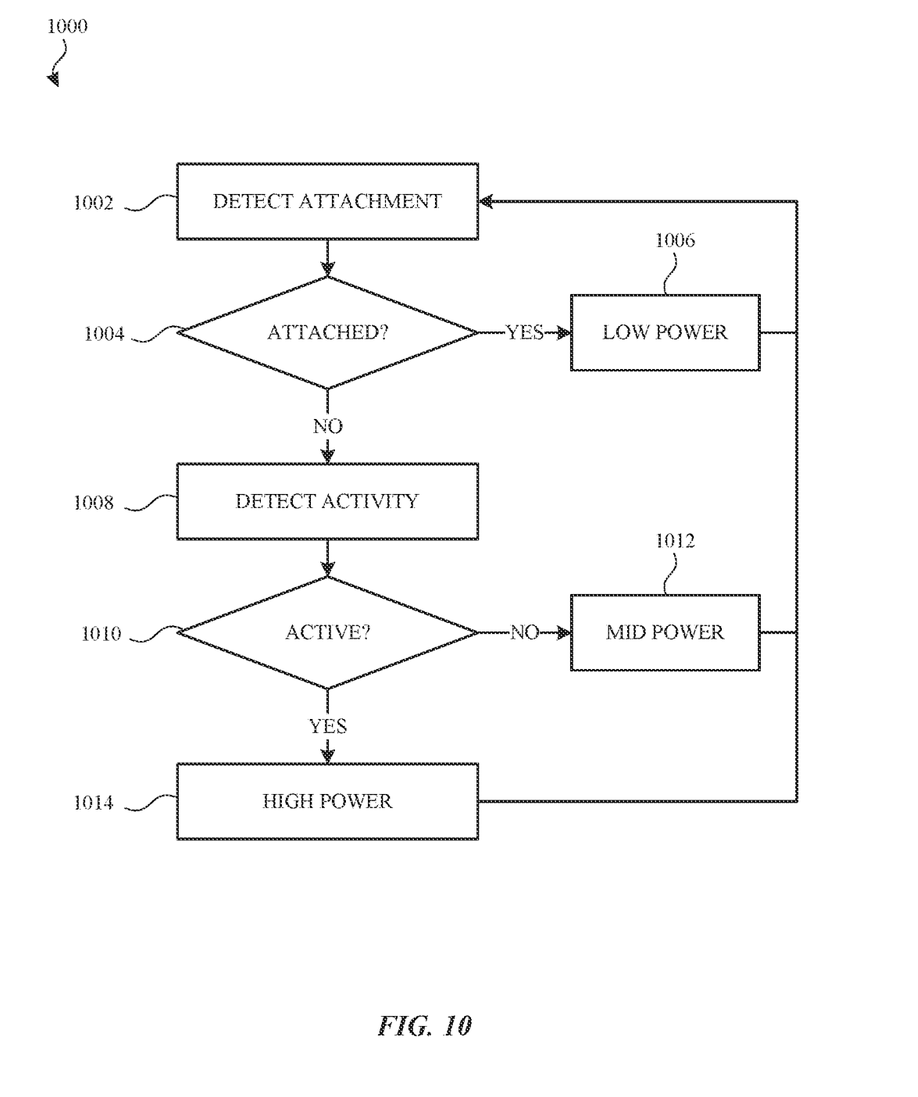
FIG. 10 illustrates a flow chart of example operations that can be performed by a stylus, according to some embodiments of the subject technology.

FIG. 10 illustrates a flow diagram of an example process 1000 for noise management that can include ameliorating an exposure to noise generated by an additional vehicle, in accordance with implementations of the subject technology. For explanatory purposes, process 1000 is primarily described herein with reference to stylus 100 as shown in FIGS. 1-9. However, process 1000 is not limited to stylus 100 of FIGS. 1-9, and one or more blocks (or operations) of process 1000 can be performed by one or more other components of other suitable devices or systems. Further for explanatory purposes, some of the blocks of process 1000 are described herein as occurring in serial, or linearly. However, multiple blocks of process 1000 can occur in parallel. In addition, the blocks of process 1000 need not be performed in the order shown and/or one or more blocks of process 1000 need not be performed and/or can be replaced by other operations.

At block 1002, a stylus (e.g., with a controller) can detect a condition relating to attachment of the stylus with respect to a host device. For example, the stylus can operate an attachment sensor (e.g., Hall effect sensor) to detect a magnetic field and/or changes therein, as described herein. It will be understood that multiple attachment sensors can be operated to detect multiple conditions.

At block 1004, the stylus (e.g., with the controller) can determine whether the stylus is attached to the host device. For example, the magnitude and/or direction of the magnetic field and/or changes therein can be compared to a threshold to determine whether such conditions satisfy the threshold. If the stylus is determined to be attached to the host device, then process 1000 can proceed to block 1006. If the stylus is determined to be not attached (e.g., separate from) to the host device, then process 1000 can proceed to block 1008.

At block 1006, the stylus (e.g., with the controller) can be actively operated in a low-power mode. While in the low-power mode, the stylus can operate (e.g., provide power to and/or cause to perform one or more operations) the attachment sensor(s) (e.g., Hall effect sensor). In some embodiments, while in the low-power mode, the stylus can disable (e.g., withhold power from and/or prevent from performing one or more operations) the activity sensor(s), the communication interface(s), the input device(s), the output device(s), the force sensor(s), the electric field generator(s), and/or the additional sensor(s). By maintaining the attachment sensor(s) in active operation, attachment and cessation thereof (e.g., detachment) of the stylus from the host device can be detected. While disabling the activity sensor(s), the input device(s), the force sensor(s), the additional sensor(s), and/or other components can limit the ability to detect activity (e.g., motion) of the stylus, the stylus can be inferred to be not in active use based solely on the detection and determination that the stylus is attached to the host device. As such, other determinations need not be made until cessation of attachment (e.g., detachment) is detected and determined. Where maintaining operation of the attachment sensor(s) consumes relatively little power relative to other components (e.g., the activity sensor(s), the input device(s), the force sensor(s), the additional sensor(s), and/or other components), it can be beneficial to base the selection of the lowest power mode (e.g., the low-power mode) on the detections of the attachment sensor(s). As such, more significant power conservation can be achieved than by detecting solely whether or not the stylus is actively being operated or manipulated by a user. The low-power mode can be maintained while process 1000 returns to block 1002 and/or another block, process, and/or operation.

At block 1008, a stylus (e.g., with the controller) can detect a condition relating to activity of the stylus. For example, the stylus can operate an activity sensor (e.g., inertial measurement unit) to detect motion of the stylus, as described herein. By further example, the stylus can operate an input device, force sensor, or other sensor to detect whether a user is holding, operating, moving, or providing input to the stylus, as described herein.

At block 1010, the stylus (e.g., with the controller) can determine whether the stylus is being actively operated. For example, the motion of the stylus can be compared to a threshold to determine whether such conditions satisfy the threshold. Such thresholds can relate to motion, position, orientation, speed, and/or acceleration of the stylus. Such thresholds can relate to whether an input from a user is received (e.g., touch input, force input, etc.) at the stylus. Such thresholds can relate to a period of time (e.g., timeout) in which such no activity is detected. For example, if detected activity is detected and/or exceeds a threshold within a time limit (e.g., 5 seconds), then the stylus can be determined to be actively operated. By further example, if detected activity is not detected and/or does not exceed a threshold within a time limit (e.g., 5 seconds), then the stylus can be determined to be not actively operated. If the stylus is determined to be actively operated, then process 1000 can proceed to block 1012. If the stylus is determined to be not actively operated (e.g., at rest), then process 1000 can proceed to block 1014.

At block 1012, the stylus (e.g., with the controller) can be actively operated in a mid-power mode. While in the mid-power mode, the stylus can operate (e.g., provide power to and/or cause to perform one or more operations) the component(s) operated in the low-power mode and at least one additional component. For example, in the mid-power mode, the stylus can operate the attachment sensor(s) (e.g., Hall effect sensor) and the activity sensor(s). In some embodiments, while in the mid-power mode, the stylus can disable (e.g., withhold power from and/or prevent from performing one or more operations) the communication interface(s), the input device(s), the output device(s), the force sensor(s), the electric field generator(s), and/or the additional sensor(s). The low-power mode can be maintained while process 1000 returns to block 1002 and/or another block, process, and/or operation.

At block 1014, the stylus (e.g., with the controller) can be actively operated in a mid-power mode. While in the high-power mode, the stylus can operate (e.g., provide power to and/or cause to perform one or more operations) the component(s) operated in the mid-power mode and at least one additional component. For example, in the high-power mode, the stylus can operate the attachment sensor(s) (e.g., Hall effect sensor), the activity sensor(s), the communication interface(s), the input device(s), the output device(s), the force sensor(s), the electric field generator(s), and/or the additional sensor(s). In some embodiments, while in the high-power mode, the stylus can optionally disable none of its components. The high-power mode can be maintained while process 1000 returns to block 1002 and/or another block, process, and/or operation.

As used herein, the stylus can actively operate a component thereof by providing power to the component and/or causing the component to perform one or more operations. Such control can be achieved by transmitting one or more signals to the component. As used herein, the stylus can disable a component thereof by withholding power therefrom and/or preventing the component from performing one or more operations. Such control can be achieved by withholding or transmitting one or more signals to the component. It will be understood that a component, when disabled, will consume less power than the component will consume when actively operated. Accordingly, selection of an operating mode can allow power to be conserved when it is determined that components need not be actively operated.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the host device can be any device that interacts with a touch-based input device. For example, a host device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

As shown, an input device, such as a stylus, can be operated to determine one or more conditions and select an appropriate operating mode. For example, a stylus can be attached to a host device when not in active use by a user. Attachment can be securely and releasably achieved with magnetic coupling. In such a configuration, the stylus can detect the attachment based on the presence and modification of magnetic fields. Based on such detection, the stylus can select an operating mode that allows power to be conserved when it is determined that certain components of the stylus need not be actively operated.

Various examples of aspects of the disclosure are described below as clauses for convenience. These are provided as examples, and do not limit the subject technology.

Clause A: a stylus comprising: a housing; a magnet assembly within the housing, the magnet assembly comprising a first permanent magnet, a second permanent magnet, and a magnetic shunt between the first permanent magnet and the second permanent magnet; and a Hall effect sensor within the housing, positioned a distance away from the magnetic shunt, and axially aligned with the magnetic shunt.

Clause B: a stylus comprising: an attachment sensor configured to detect when the stylus is attached to a host device; an activity sensor configured to detect when the stylus is moved; a communication interface configured to communicate with the host device; and a controller configured to select one of multiple operating modes for operating the stylus, the operating modes comprising: a low-power mode, in which the attachment sensor is actively operated, and the activity sensor and the communication interface are disabled; a mid-power mode, in which the attachment sensor and the activity sensor are actively operated, and the communication interface is disabled; and a high-power mode, in which the attachment sensor, the activity sensor, and the communication interface are actively operated.

Clause C: a stylus comprising: an attachment sensor configured to detect when the stylus is attached to a host device; an activity sensor configured to detect when the stylus is moved, the attachment sensor being configured to be either actively operated or disabled in response to an attachment detection by the attachment sensor; and a communication interface configured to communicate with the host device, the communication interface being configured to be either actively operated in response to an activity detection by the activity sensor or disabled in response to the attachment detection by the attachment sensor.

One or more of the above clauses can include one or more of the features described below. It is noted that any of the following clauses can be combined in any combination with each other, and placed into a respective independent clause, e.g., clause A, B, or C.

Clause 1: the Hall effect sensor is arranged to detect a magnetic field having a component that is orthogonal to a longitudinal axis of the stylus.

Clause 2: the Hall effect sensor is closer to the magnetic shunt than to either of the first permanent magnet or the second permanent magnet.

Clause 3: a circuit board, wherein the Hall effect sensor is positioned on a side of the circuit board that faces away from the magnet assembly.

Clause 4: the first permanent magnet has a first magnetic polarity orientation; and the second permanent magnet has a second magnetic polarity orientation, different than the first magnetic polarity orientation.

Clause 5: the first permanent magnet and the second permanent magnet comprise a hard magnetic material, and the magnetic shunt comprises a soft magnetic material.

Clause 6: the magnetic shunt is a first magnetic shunt; the Hall effect sensor is a first Hall effect sensor; the magnet assembly further comprises: a third permanent magnet; and a second magnetic shunt between the second permanent magnet and the third permanent magnet; and the stylus further comprises a second Hall effect sensor that is within the housing, positioned a distance away from the second magnetic shunt, and axially aligned with the second magnetic shunt.

Clause 7: the first permanent magnet has a first magnetic polarity orientation; the second permanent magnet has a second magnetic polarity orientation, different than the first magnetic polarity orientation; and the third permanent magnet has a third magnetic polarity orientation that is the same as the first magnetic polarity orientation.

Clause 8: the magnet assembly is a first magnet assembly; and the stylus further comprises a second magnet assembly within the housing and axially spaced apart from the first magnet assembly.

Clause 9: an input device configured to receive an input from a user; a force sensor configured to detect a force between a tip of the stylus and a housing of the stylus; and an electric field generator configured to generate an electric field at the tip of the stylus, wherein: in each of the low-power mode and the mid-power mode, the input device, the force sensor, and the electric field generator are disabled; and in the high-power mode, the input device, the force sensor, and the electric field generator are actively operated.

Clause 10: the attachment sensor comprises a Hall effect sensor.

Clause 11: the activity sensor comprises an inertial measurement unit.

Clause 12: the activity sensor comprises an input device of the stylus.

Clause 13: the attachment sensor is configured to be actively operated when the stylus is attached to the host device and when the stylus is separated from the host device; the attachment sensor is configured to be actively operated when the stylus is separated from the host device and disabled when the stylus is attached to the host device; and the communication interface is configured to be actively operated when the stylus is moved and disabled when the stylus is attached to the host device.

Clause 14: an input device configured to receive an input from a user; a force sensor configured to detect a force between a tip of the stylus and a housing of the stylus; and an electric field generator configured to generate an electric field at the tip of the stylus, wherein each of the input device, the force sensor, and the electric field generator are configured to be either actively operated in response to the activity detection by the activity sensor or disabled in response to the attachment detection by the attachment sensor.

Various processes defined herein consider the option of obtaining and utilizing a user's personal information. For example, such personal information can be utilized for spatial modeling of enclosed environments for control of acoustic components. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties can access or otherwise obtain personal information. For instance, settings or other preferences can be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

Accordingly, embodiments of the subject technology described herein provide for a vehicle with a seat assembly that provides an ability for the seat to rotate about an axis within each front and rear ranges. When the seat is moved to a transition range, circumferentially between the front and rear ranges, an actuator can be operated to apply a torque and assist with transition to the other range. Other structures can move to facilitate the transition of the seat. The seat assembly can also have locked positions, in which the seat is limited in its rotation. Such dynamic adjustment capabilities allow the seat to provide flexibility and stability as needed based on the applicable conditions.

It is understood that any specific order or hierarchy of blocks in the processes disclosed is an illustration of example approaches. Based upon design preferences, it is understood that the specific order or hierarchy of blocks in the processes can be rearranged, or that all illustrated blocks be performed. Any of the blocks can be performed simultaneously. In one or more embodiments, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component can also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an embodiment, the embodiment, another embodiment, some embodiments, one or more embodiments, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) can apply to all configurations, or one or more configurations. A disclosure relating to such phrase(s) can provide one or more examples. A phrase such as an aspect or some aspects can refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 104(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neutral gender (e.g., her and its) and vice versa. Headings and subheadings, if any, are used for convenience only and do not limit the subject disclosure.

What is claimed is:

1. A stylus comprising:
   a housing;
   a magnet assembly within the housing, the magnet assembly comprising a first permanent magnet, a second permanent magnet, and a magnetic shunt between the first permanent magnet and the second permanent magnet; and
   a Hall effect sensor within the housing, positioned a distance away from the magnetic shunt, and axially aligned with the magnetic shunt such that the Hall effect sensor and the magnetic shunt share a same axial position along a longitudinal axis of the stylus, wherein the Hall effect sensor is closer to the magnetic shunt than to either of the first permanent magnet or the second permanent magnet.

2. The stylus of claim 1, wherein the Hall effect sensor is arranged to detect a magnetic field having a component that is orthogonal to the longitudinal axis of the stylus.

3. The stylus of claim 1, further comprising a circuit board, wherein the Hall effect sensor is positioned on a side of the circuit board that faces away from the magnet assembly.

4. The stylus of claim 1, wherein:
   the first permanent magnet has a first magnetic polarity orientation; and
   the second permanent magnet has a second magnetic polarity orientation, different than the first magnetic polarity orientation.

5. The stylus of claim 1, wherein the first permanent magnet and the second permanent magnet comprise a hard magnetic material, and the magnetic shunt comprises a soft magnetic material.

6. The stylus of claim 1, wherein:
   the magnetic shunt is a first magnetic shunt;
   the Hall effect sensor is a first Hall effect sensor;
   the magnet assembly further comprises:
      a third permanent magnet; and
      a second magnetic shunt between the second permanent magnet and the third permanent magnet; and
   the stylus further comprises a second Hall effect sensor that is within the housing, positioned a distance away from the second magnetic shunt, and axially aligned with the second magnetic shunt.

7. The stylus of claim 6, wherein:
   the first permanent magnet has a first magnetic polarity orientation;
   the second permanent magnet has a second magnetic polarity orientation, different than the first magnetic polarity orientation; and
   the third permanent magnet has a third magnetic polarity orientation that is the same as the first magnetic polarity orientation.

8. The stylus of claim 1, wherein:
   the magnet assembly is a first magnet assembly; and
   the stylus further comprises a second magnet assembly within the housing and axially spaced apart from the first magnet assembly.

9. A stylus comprising:
   an attachment sensor configured to detect when the stylus is attached to a host device;
   an activity sensor configured to detect when the stylus is moved;

a communication interface configured to communicate with the host device; and a controller configured to select one of multiple operating modes for operating the stylus, the operating modes comprising:
- a low-power mode, in which the attachment sensor is actively operated, and the activity sensor and the communication interface are disabled;
- a mid-power mode, in which the attachment sensor and the activity sensor are actively operated, and the communication interface is disabled; and
- a high-power mode, in which the attachment sensor, the activity sensor, and the communication interface are actively operated.

10. The stylus of claim 9, further comprising:
an input device configured to receive an input from a user;
a force sensor configured to detect a force between a tip of the stylus and a housing of the stylus; and
an electric field generator configured to generate an electric field at the tip of the stylus, wherein:
- in each of the low-power mode and the mid-power mode, the input device, the force sensor, and the electric field generator are disabled; and
- in the high-power mode, the input device, the force sensor, and the electric field generator are actively operated.

11. The stylus of claim 9, wherein the attachment sensor comprises a Hall effect sensor.

12. The stylus of claim 9, wherein the activity sensor comprises an inertial measurement unit.

13. The stylus of claim 9, wherein the activity sensor comprises an input device of the stylus.

14. A stylus comprising:
an attachment sensor configured to detect when the stylus is attached to a host device;
an activity sensor configured to detect when the stylus is moved, the attachment sensor being configured to be either actively operated or disabled in response to an attachment detection by the attachment sensor; and
a communication interface configured to communicate with the host device, the communication interface being configured to be either actively operated in response to an activity detection by the activity sensor or disabled in response to the attachment detection by the attachment sensor.

15. The stylus of claim 14, wherein:
the attachment sensor is configured to be actively operated when the stylus is attached to the host device and when the stylus is separated from the host device;
the attachment sensor is configured to be actively operated when the stylus is separated from the host device and disabled when the stylus is attached to the host device; and
the communication interface is configured to be actively operated when the stylus is moved and disabled when the stylus is attached to the host device.

16. The stylus of claim 14, further comprising:
an input device configured to receive an input from a user;
a force sensor configured to detect a force between a tip of the stylus and a housing of the stylus; and
an electric field generator configured to generate an electric field at the tip of the stylus,
wherein each of the input device, the force sensor, and the electric field generator are configured to be either actively operated in response to the activity detection by the activity sensor or disabled in response to the attachment detection by the attachment sensor.

17. The stylus of claim 14, wherein the attachment sensor comprises a Hall effect sensor.

18. The stylus of claim 14, wherein the activity sensor comprises an inertial measurement unit.

19. The stylus of claim 14, wherein the activity sensor comprises an input device of the stylus.

* * * * *